J. STIMPSON.
Street Railway.
RX 23
No. 23.
Reissued Aug. 26, 1840.
6715X Related Doc
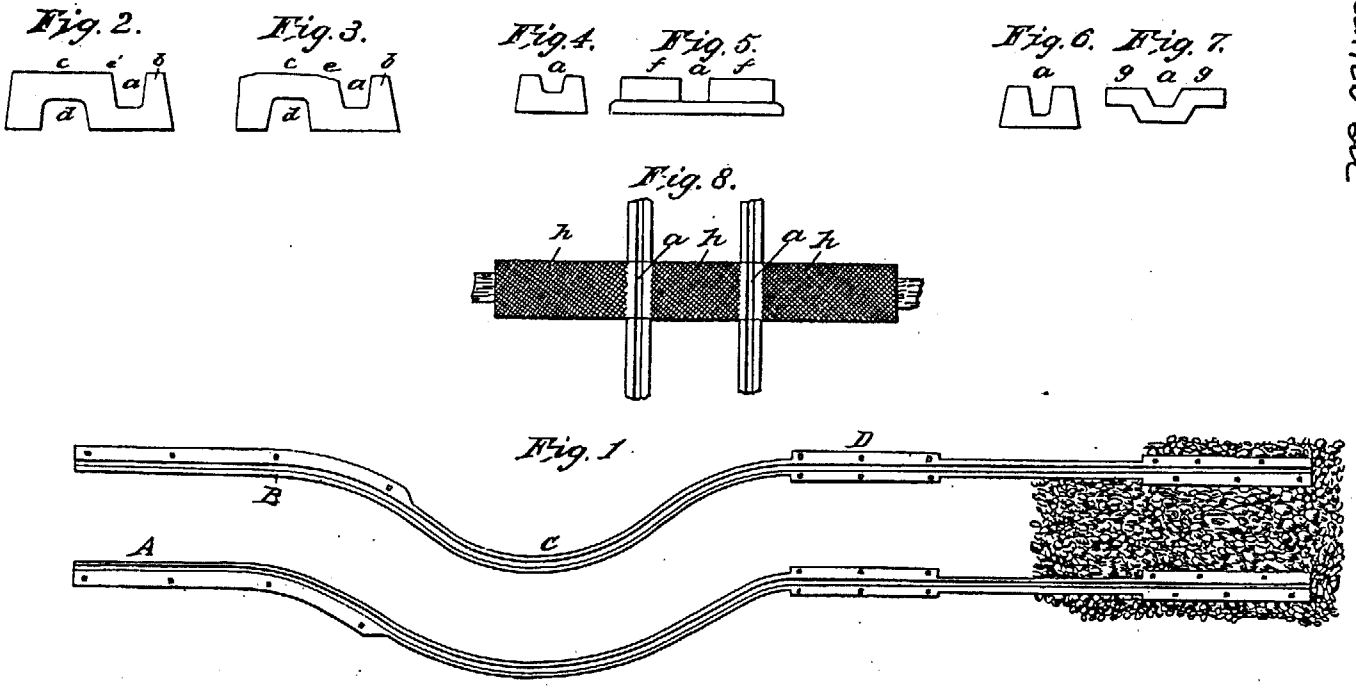

UNITED STATES PATENT OFFICE.

RX23

JAMES STIMPSON, OF BALTIMORE, MARYLAND.

IMPROVEMENT IN THE MODE OF FORMING AND USING CAST OR WROUGHT IRON PLATES OR RAILS FOR RAILROAD-CARRIAGE WHEELS TO RUN UPON.

6715 RELATED DOC

Specification forming part of Letters Patent dated August 23, 1831; Reissued September 26, 1835; Reissue No. 23, dated August 27, 1840.

*To all whom it may concern:*

Be it known that I, JAMES STIMPSON, of the city of Baltimore, in the State of Maryland, have invented a new and useful improvement in the mode of forming and using cast or wrought iron plates or rails for railroad-carriage wheels to run upon, more especially for those to be used on the streets of cities, on wharves, and elsewhere; and I do hereby declare that the following is a full and exact description of my said inventions or improvements.

For the purpose of carrying railroads through the streets of towns or cities, and in other situations where circumstances may render it desirable that the wheels of ordinary carriages should not be subjected to injury or obstruction, I so construct or form the rails that the flanges of the wheels of railroad cars or carriages may be received and run within narrow grooves or channels formed in or by said rails, said grooves not being sufficiently wide to admit the rims of the wheels of gigs or other ordinary carriages having wheels of the narrowest kind. These plates or rails may be varied in form, according to circumstances.

In the accompanying drawings, Figure 1 represents a railroad-track supposed to be formed in a street, a part of it being shown as straight and a part as curved.

The other figures give sectional views of various forms in which I make my railway bars or plates, which are usually of cast-iron, and are laid and secured down upon rails of wood.

Fig. 2 is a section of the form of cast-iron rail plate which I most commonly use where the track is slightly curved; and Fig. 3, a plate nearly the same with Fig. 2, which I use where the track is nearly or quite straight. In these plates I make a groove or channel, as at *a*, which is to receive the flange of the wheel. This channel should be about an inch and a half wide at top and about an inch and a quarter at bottom. It is sufficiently deep to admit the flange of the wheel to run in it without touching its bottom. The lower corners of the interior of this channel I make rounding or curved, in order that any dirt or other foreign matter collected therein may be the more readily forced out by the action of the flanges. The cheek or jamb *b*, which is on the inside of the channel, should be about three-fourths of an inch wide at top, and as high, or nearly so, as the face *c* of the plate upon which the tread of the wheel is to run. These plates I cast hollow at *d* to save weight. They should be about two inches and a quarter deep, six inches and a half wide at the bottom, and about six inches and a quarter at the top, the taper at their sides when thus formed aiding in confining them in place by the wedging of the stones and earth of the pavement against them. They may be cast three or four feet in length. Their ends should be beveled—say at an angle of forty-five degrees; or they may be formed with a tenon and mortise. They have spike-holes through them, in order to fasten them down to the rails of wood or of stone upon which they are placed.

Fig. 3 is the same with Fig. 2, excepting that it has a slight chamfer or rounding off of the angle of the face, as shown at *c*, to admit the cone or curve on the tread of the wheel where it joins the flange to run free so that the general tread of the wheel may bear on the face *c* of the plate, which face I prefer to make a little crowning. Where the road is perfectly straight, as at A, on the track, this chamfered-edge plate is to be preferred; but where it is slightly curved, as at B, on the track, I on the outside of the curve use the rails shown in Fig. 2, which are not chamfered, as the conical or larger part of the tread of the wheel close to the flange will then bear upon the edge *c'*, and this being larger than the tread will cause the wheels to roll round such curved parts of the road with little or no slipping.

Where it is necessary to turn a curve of shorter radius than that which could be readily effected by the aid of the conical part of the wheel, as at C, on the track, I then resort to the plan secured to me by Letters Patent for "turning short curves on railroads," which Letters Patent bear the same date, having been granted on the same day with the Letters Patent of which this instrument makes a part, for railroad-plates to be used on the streets of cities, &c.—that is to say, I apply "the flanges of the wheels on one side of railroad-carriages, and the treads of the wheels on the other side, to turn curves on railways." In this case a railroad-plate may be made like that shown in Fig. 4 to form the channel for the wheel on the larger or outer curve. In this case the groove or channel is not to be equal in depth to the rise or projection of the flange, so that the flange alone bears on the rail on this outer side, and takes the whole weight of the load, thus freeing the tread of the wheel on that side from the face of the plate for the distance necessary to turn the curve, for a full exemplification of which plan I refer to said Letters Patent for "turning short curves." Such curves, however, will rarely, if ever, occur, excepting in the turning of the corners of streets, and to this particular mode I make no claim in the present patent. When the wheels arrive at the straight part of a track after having run upon a curved part, the rails shown in Fig. 3 are used, or others of a like nature.

It is to be understood that the object had in view in varying the form of the rails by chamfering, as in Fig. 3, or by omitting the chamfer, as in Fig. 2, is to attain the same end—namely, the running with little friction or dragging around curves in streets—which is attained on the ordinary railroad-tracks out of cities by allowing the cars to vibrate from side to side, so that the varying diameter on the conical parts of the treads of the wheels may cause them to adapt themselves to curvatures on the road. The narrow channels used by me, and so essential in cities, do not admit of this lateral vibration; but by the devices above described a similar result is attained.

In most cases for passing along streets, and more especially when the iron rails are embedded in rails or sills of stone, I prefer so to construct the said iron rails as that the wheels shall run altogether on their flanges. In this case I use iron plates such as are represented in Fig. 4. These plates may be made two inches and three-quarters wide at top and three inches at the bottom. The channel or groove may be about five-eighths of an inch in depth, an inch and a quarter wide at the top, and an inch at the bottom, the corners at the bottom of the groove being curved, as in Figs. 2 and 3. The thickness below the bottom of the groove or channel may be three-fourths of an inch. The plates would then be one inch and three-eighths in depth. These shallow-channeled plates present several advantages, among which are that they will offer less resistance than others to the motion of the cars; they are much lighter than others; they will not require any cleaning out, the flanges effecting this perfectly, which may not always be the case in deeper channels. These shallow channels may be made narrower than the deeper ones, the flanges being much thinner at their outer edges than they are near to the treads of the wheels. The wheels will undoubtedly be as safely guided in the shallow as in the deeper channels, and the rails will be equally durable with those of greater weight. When rails of this description are sunk into a channel in a rail of stone or of wood, the base being wider than their upper sides, the pressure of sand into the seams on each side of the iron, caused by the running of common carriage-wheels over them, will effectually confine the iron plates between the jambs of the stone or wood.

Fig. 6 shows a rail-plate resembling Fig. 4, but having a channel the whole depth of the flange.

Should it be preferred to use the ordinary flat wrought-iron rails, they may be laid double at such a distance apart as to form the proper channel for the flange between them.

*f f*, Fig. 5, are sections of two such iron plates, and are shown as used at D on the track. Wrought-iron plates may also be formed in the manner represented in Fig. 7. This plate is rolled so as to have a channel, *a*, in it, which may be one inch and a quarter wide at top, one inch at bottom, and five-eighths of an inch deep. The plate *g g* on each side of the channel may be two inches wide. The whole plate may be of uniform thickness, and furnished with spike-holes alternately on each side of the channel. These are supposed to be used at E on the track.

Where it is necessary to cross a water-gutter in the street, I use a cast-iron plate or plates to cover said gutter, the flange-channels being cast in such plate or plates. The whole surface between the channels is cast rough to prevent the slipping of the feet of horses. The aforesaid cast-iron plate is best cast in one piece, as it will be stronger than if divided, although of the same thickness. It must, of course, be of a width sufficient for the particular gutter to which it is to be applied, and it should be strengthened by having ribs cast on its lower side. These should be about an inch and a quarter deep, exclusive of the thickness of the plate. In some cases I cover the gutters the whole width of the street with such cast-iron plates, and extend them to some distance beyond the curbings. I thus make a great improvement in streets for the ordinary purposes of travel. Such a plate is shown in Fig. 8, *a a* being the grooved channels cast therein, and *h h* the upper face of the plate cast rough or checkered.

Having thus fully described the nature of my improvements, and pointed out various modes in which the same may be carried into effect, what I claim as constituting my invention, and desire to secure by Letters Patent, is—

1. The employment of plates or rails, either of cast or of wrought iron, constructed and operating upon the principle or in the manner herein described, having narrow grooves on each side of the track for the flanges of car-wheels to run in, by which they are adapted to the unobstructed passing over them of the various kinds of common carriages, and to the running of the wheels on slight curves without dragging.

2. In combination with such grooved rails or tracks, the employment of plates of cast-iron for the covering and crossing of gutters, such plates being constructed as described, and having the necessary flange-channels cast in them, and I do hereby declare that I do not intend to confine myself to the precise forms and dimensions herein given, these being designed merely to exemplify in a clear manner the nature, object, and mode of carrying into effect of my said invention.

JAMES STIMPSON.

Witnesses:
I. M. STIMPSON,
S. E. STIMPSON.